Aug. 25, 1942.   A. H. THOMPSON   2,294,059
SELF-LOCKING NUT
Filed Nov. 12, 1941

Inventor
Arthur H. Thompson
By Fred Gerlach
his Atty

Patented Aug. 25, 1942

2,294,059

UNITED STATES PATENT OFFICE 2,294,059

SELF-LOCKING NUT

Arthur H. Thompson, Chicago, Ill., assignor to Thompson-Bremer & Co., Chicago, Ill., a corporation of Illinois Application November 12, 1941, Serial No. 418,742

3 Claims. (Cl. 151—14)

The invention relates to self-locking nuts.

One object of the invention is to provide an improved one-piece self-locking nut which is formed of plate metal and comprises a rigid sleeve provided on its inner periphery with an uninterrupted screw-thread, for engaging the thread on a bolt or screw, of a sufficient number of convolutions to interfit with the thread on the bolt or screw when the work is engaged so it will withstand heavy loads and which is so provided with means for effectively and automatically locking the nut on the bolt or screw against reverse rotation.

Other objects of the invention will appear from the description of the details.

The invention consists in the several novel features which are hereinafter set forth and are more particularly defined by claims at the conclusion hereof.

Figure 1:
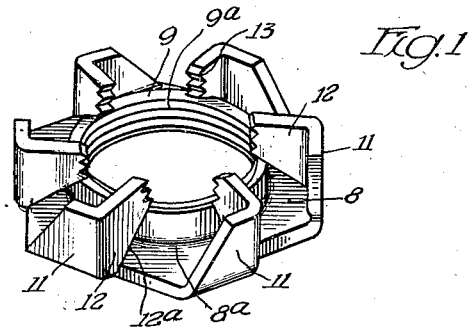
Figure 2:
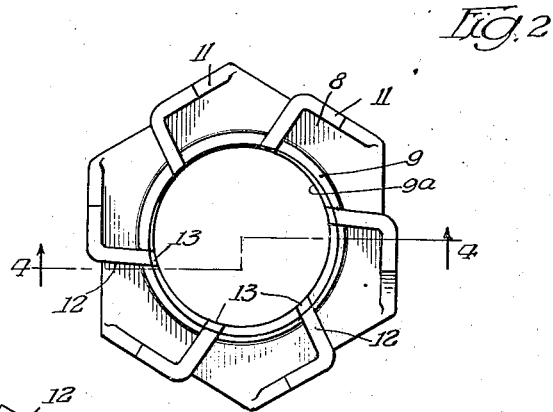
Figure 3:
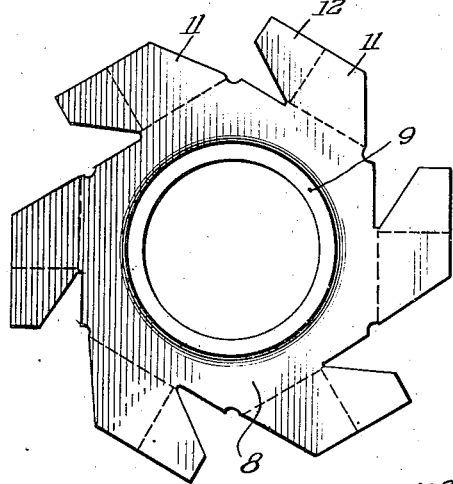
Figure 4:
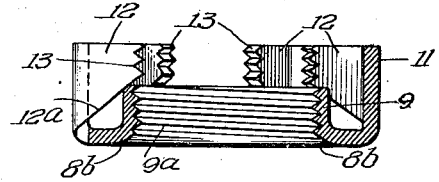
Figure 5:
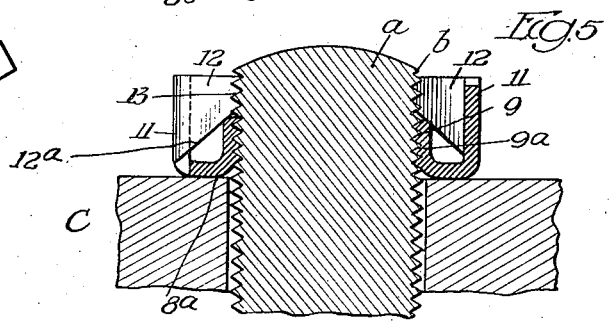

In the drawing Fig. 1 is the perspective of the lock-nut embodying the invention. Fig. 2 is a plan. Fig. 3 is a plan, illustrating a blank from which the nut is formed after the sleeve has been formed thereon. Fig. 4 is a section taken on line 4—4 of Fig. 2. Fig. 5 is a similar section illustrating the nut after it has been applied to the work.

The invention is exemplified in a self-locking nut formed of a blank of flat plate metal of sufficiently heavy stock to function as a nut. All of the parts of the nut are integral. The nut comprises a hexagonal base 8 which extends transversely of the axis of the screw $a$ or bolt $a$ or other element having a screw-thread, and is adapted to abut against the work $c$, which may be any element through which the bolt or screw extends. The central portion of the base is annularly flanged to form an integral and rigid upstanding cylindrical sleeve 9. A screw-thread 9a of several uninterrupted convolutions is formed on the inner periphery of the sleeve for interfitting with and engaging a sufficient area between the nut and the bolt to withstand heavy loads. The sleeve 9 is formed by flanging the central portion of the blank from which the base is formed. Each side of the hexagonal base 8 has an upturned flange 11, which extends substantially at right angles to the plane of the base, and is formed by bending the blank upwardly from the outer edge of the base. Each flange 11 is provided at one of its ends with a resilient tongue 12 which is formed by bending a strip of the stock radially inward from one end of the flange. Each tongue 12 and flange 11 is of greater height than the sleeve 9. The inner end of each tongue 12 is provided with a plurality of V-shaped teeth 13 which extend longitudinally of the screw and are shaped to conform substantially to the V-shaped cross-section of the groove of the thread $b$ on the screw $a$. These teeth 13 are preferably sufficient in number for interfitting with a sufficient number of the convolutions of the groove in thread $b$ for effectively gripping the screw when pressure is exerted by them against the screw. The teeth on the tongues are helically arranged in phase with the thread 9a in the sleeve 9 and fit between and engage the side faces of the successive convolutions of the thread $b$. The tongues 12 extend inwardly so their teeth 13, when the tongues are pressed inwardly, will engage the screw-thread $b$. The lower edges 12a of tongues 12 extend obliquely upward and inwardly from the base 8 to a point above the upper end of sleeve 9. The tongues 12 are laterally resilient and extend inward at such an angle that their teeth-equipped ends will slide freely around the faces of the screw while the nut is being turned onto the screw, and will bite into said faces when the nut is urged rotatably in the opposite direction after the tongues are pressed against the screw $a$. The portion 8a which joins the sleeve 9 and the base 8 is slightly curved so that the outer portion of the base will be engaged by the work.

When the nut is rotated onto the bolt $a$ the sleeve 9 will first engage the thread $b$ on the bolt $a$ and advance the nut toward the work $c$. Before the base 8 engages the work, the teeth 13 will interfit with the convolutions of the screw-thread $b$ above the sleeve 9. After the base 8 engages the work, the latter, as the rotation of the nut continues, will exert an upward and inward pressure on the flanges 11 which will cause their upper ends to be flexed toward the screw-thread $b$ and cause the teeth 13 on the tongues 12 to be forced against the side faces of the screw-thread $b$. The radial angle of the tongues 12 is such that they can flex transversely of, and will slide around the side-faces of, the thread on the screw while the nut is being rotated onto the screw, and so that any stresses tending to rotate the nut in reverse direction will tend to force the tongues toward their dead-center and cause the teeth to bite into the side faces of the screw-thread $b$, thus locking the nut against release from the bolt or screw. When it is desired to remove the nut from the screw, a special wrench is provided by which the tongues will be bent away from the screw to permit the nut to be reversely rotated.

The entire nut is formed from a blank of plate metal which is cut to the contour illustrated in Fig. 3. The central portion of the blank is first spun or drawn to form the completely cylindrical rigid sleeve 9. The blank as trimmed provides integral portions for the upstanding flanges 11 and the tongues 12. The tongues are bent at the desired angles to the flange portions 11, and the latter are then bent at right angles to the base to bring their inner ends so they will lap the sleeve 9. The partially formed nut is then placed in a suitable jig and the sleeve 9 and the inner ends of the tongues are consecutively cut by a suitable screw-cutting tap to produce the screw-thread 9ᵃ on the inner periphery of the sleeve and by cutting co-axially with the sleeve, form the teeth 13 on the tongues, which will all conform substantially to the thread on the screw b. This results in producing teeth 13 which normally fit loosely around the side faces of the screw-thread b, the same as the thread 9ᵃ on the sleeve, so that the nut can be freely rotated on the screw a until the base 8 of the nut engages the work. When pressure is exerted against the outer portion of the base by the work, the teeth 13 will be forced to bite into the side faces of the screw-thread b and lock the nut on the screw.

In practice it has been found that when a nut is subjected to heavy loads or stresses it is essential to provide a rigid sleeve 9 of sufficient length and with a sufficient number of convolutions of screw-threads 9ᵃ to form an uninterrupted and rigid engagement between the nut and the bolt. The sleeve provides a portion on the nut which is rigid and cannot be flexed when the nut is subjected to loads. The resilient tongues with their teeth-equipped ends above the sleeve provide adequate means for automatically locking the nut against reverse rotation, particularly when the nut is subjected to pressure by the work.

The invention is not to be understood as restricted to the details set forth, since these may be modified within the scope of the appended claims without departing from the spirit and scope of the invention.

What I regard as new and desire to claim by Letters Patent is:

1. A self-locking nut, for use on the screw-thread of an element, formed of one piece of plate metal and comprising a base, a continuous annular upturned flange on the central portion of the base, provided on its inner periphery with a plurality of uninterrupted convolutions of screw thread for engaging the thread on the screw, and forming a rigid internally threaded sleeve, and an annularly arranged series of tongues on the base, having side faces extending substantially at right angles to the base, and provided at their inner ends and above the sleeve with teeth helically arranged to conform with the spiral of the thread of the screw and adapted to fit between and engage the side faces of the several convolutions of the thread on the screw, the tongues being laterally resilient and extending inwardly in such a direction that their teeth-equipped ends will slide on the thread of the screw while the nut is being turned onto the screw and will bite into the face of the screw when the nut is urged rotatably in the opposite direction.

2. A self-locking nut, for use with a screw-thread on an element, formed of one piece of plate metal and comprising a base, a continuous annular upturned flange on the central portion of the base, provided on its inner periphery with a plurality of uninterrupted convolutions of screw thread for engaging the thread on the screw, and forming a rigid internally threaded sleeve, and an annularly arranged series of upstanding flanges on the margin of the base, forming polygonal sides, and an annularly arranged series of tongues on the base, having side faces extending substantially at right angles to the base and provided at their inner ends with teeth above the sleeve, helically arranged to conform with the spiral of the thread of the screw, and adapted to fit between and engage the side faces of the several convolutions of the thread on the screw, the tongues extending inwardly from the side flanges, being laterally resilient, and extending inwardly in such a direction that their teeth-equipped ends will slide on the face of the work while the nut is being turned onto the screw and will bite into the face of the work when the nut is urged rotatably in the opposite direction.

3. A self-locking nut, for use with a screw-thread on an element, formed of one piece of plate metal and comprising a base, a continuous annular upturned flange on the central portion of the base, provided on its inner periphery with a plurality of uninterrupted convolutions of screw thread for engaging the thread on the screw, and forming a rigid internally threaded sleeve, an annular arranged series of upstanding flanges on the base, forming polygonal sides, and an annularly arranged series of tongues joined to the base, having side faces extending substantially at right angles to the base and provided at their inner ends with teeth above the sleeve, helically arranged to conform with the spiral of the thread of the screw, and adapted to fit between and engage the side faces of the several convolutions of the thread, the tongues extending inwardly from the side-forming flanges, being laterally resilient and extending inwardly in such a direction that their teeth-equipped ends will slide on the face of the work while the nut is being turned onto the screw and will bite into said face when the nut is urged rotatably in the opposite direction, the marginal portion of the base being adapted to be flexed by the work to force the tongues inwardly.

ARTHUR H. THOMPSON.